US010489829B1

(12) United States Patent
Isgar

(10) Patent No.: US 10,489,829 B1
(45) Date of Patent: Nov. 26, 2019

(54) CHARITY DONATION SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

(21) Appl. No.: 16/196,724

(22) Filed: Nov. 20, 2018

Related U.S. Application Data

(62) Division of application No. 15/996,368, filed on Jun. 1, 2018.

(51) Int. Cl.
*G06Q 30/02* (2012.01)
*G06Q 30/00* (2012.01)
*H04W 4/021* (2018.01)
*G06Q 30/04* (2012.01)
*G06Q 20/10* (2012.01)

(52) U.S. Cl.
CPC ....... *G06Q 30/0279* (2013.01); *G06Q 20/108* (2013.01); *G06Q 30/018* (2013.01); *G06Q 30/04* (2013.01); *H04W 4/021* (2013.01)

(58) Field of Classification Search
None
See application file for complete search history.

(56) References Cited

U.S. PATENT DOCUMENTS

| 6,092,052 A | 7/2000 | Ziarno |
| 2004/0122682 A1 | 6/2004 | Gruber et al. |
| 2006/0026056 A1 | 2/2006 | Weiner et al. |
| 2012/0254032 A1* | 10/2012 | Carbonell Duque ........ G06Q 20/3278 705/44 |
| 2013/0018705 A1 | 1/2013 | Heath et al. |
| 2013/0254107 A1* | 9/2013 | McClure ............ G06Q 40/00 705/42 |
| 2014/0304187 A1 | 10/2014 | Menn |
| 2015/0019432 A1* | 1/2015 | Burns ............ G06Q 20/3278 705/44 |
| 2015/0120553 A1* | 4/2015 | Li ............. H04M 1/72522 705/44 |

(Continued)

OTHER PUBLICATIONS

"NCR and Krispey Kreme Digitize the Salvation Army's Red Kettle Christmas Campaign via Mobile App." Press Release/Investor Relations/NCR Sep. 28, 2018.

(Continued)

*Primary Examiner* — Dennis W Ruhl
(74) *Attorney, Agent, or Firm* — Schmeiser, Olsen & Watts LLP

(57) ABSTRACT

A charitable donation system is provided. The system includes a computer server having a memory storing charitable organization data and user data, a collection device coupled to the computer server, and a user computing device coupled to the computer server. The system establishes a geofence around the collection device. When a user computing device enters the geofence, a connection between the server and the user computing device is established. The computer server may be programmed to receive from the user computing device a signal activating a donation, the signal including user data and donation data, including a user identifying information, a donation amount, and the payment instrument initiating the payment amount. The computer server may automatically process the payment and send a communication to the collection device to account for the donation amount.

12 Claims, 5 Drawing Sheets

(56) References Cited

U.S. PATENT DOCUMENTS

| | | | |
|---|---|---|---|
| 2016/0088449 A1* | 3/2016 | Sharma | H04W 4/12 |
| | | | 455/426.1 |
| 2016/0098696 A1 | 4/2016 | Sundaram | |
| 2016/0323812 A1 | 11/2016 | Moon | |
| 2016/0349984 A1 | 12/2016 | Ding | |
| 2017/0032354 A1* | 2/2017 | Tilahun | G06Q 20/3223 |
| 2017/0098210 A1 | 4/2017 | Laracey et al. | |
| 2018/0181928 A1* | 6/2018 | Woo | G06Q 20/3224 |

OTHER PUBLICATIONS

"Recent Advances in Wireless Indoor Localization Techniques and System" Journal of Computer Networks and Communications vol. 2013 (2013), Article ID 185138, 12 pages.

"Salvation Army Ponders Cashless Kettle as Digital Donations Increase." Chicago Tribune Dec. 19, 2017.

\* cited by examiner

CHARITY DONATION SYSTEM

CROSS REFERENCE TO RELATED APPLICATION[S]

This application is a divisional of the earlier U.S. Utility patent application entitled "CHARITY DONATION SYSTEM," Ser. No. 15/996,368, filed Jun. 1, 2018, the disclosure of which is hereby incorporated entirely herein by reference.

BACKGROUND OF THE INVENTION

Technical Field

This invention relates generally to a charitable contribution system, and more particularly to a system for providing electronic contributions to charitable organizations and verification of valid charitable organizations.

State of the Art

Charitable organizations historically have various ways of collecting donations. For example, one way is to have an employee or volunteer collecting cash and coins operating a collection container inside or outside of a business, like a grocery store, department store and the like. In these instances, people with spare change or cash can deposit money into the container. This has significant drawbacks, such as theft of the donations, fewer donations as more and more people do not carry cash, lack of verification of the collection container really being associated with a charitable organization, and the like.

Accordingly, there is a need for an improved system for collecting charitable money donations.

DISCLOSURE OF THE INVENTION

The present invention relates to a charitable donation system that verifies the charitable organization as legitimate and allows for electronic donations from a plurality of users. Additionally, the invention relates to a system that provides an easy form of giving to verified charitable organizations without the use of cash.

An embodiment includes a charitable donation system comprising: a computer server having a memory storing charitable organization data and user data; a collection device coupled to the computer server; and a user computing device coupled to the computer server, the computer server programmed to: receive from the collection device a signal that the collection device is active and ready to accept donations and automatically generate and send for auto-execution instructions to establish a geofence around the collection device; receive a signal from the collection device that a user computing device of the system has entered the geofence; automatically establish a connection between the server and the user computing device in response to the user computing device entering the geofence; receive from the user computing device a signal activating a donation, the signal including user data and donation data, including a user identifying information, a donation amount, and the payment instrument initiating the payment amount; and automatically process the payment and send a communication to the collection device to account for the donation amount.

Another embodiment includes a charitable donation system comprising: a computer server having a memory storing charitable organization data and user data; a collection device coupled to the computer server; and a user computing device coupled to the computer server, wherein: the computer server is programmed to: receive from the collection device a signal that the collection device is active and ready to accept donations and automatically access memory to confirm that the charitable organization associated with the collection device is a legitimate charitable organization; and automatically generate and send for auto-execution instructions to establish a geofence around the collection device; and the collection device is programmed to: receive a signal that a user computing device of the system has entered the geofence; automatically establish a connection between the collection device and the user computing device in response to the user computing device entering the geofence; receive from the user computing device a signal activating a donation, the signal including user data and donation data, including a user identifying information, a donation amount, and the payment instrument initiating the payment amount; and automatically process the payment and account for the donation amount and automatically send a communication to the computer server to account for the donation amount and user identifying information associated with the donation amount.

Another embodiment includes a system for initiating a donation, the system comprising: a user computing device; and a collection device coupled to the user computing device, the user computing device programmed to: automatically monitor signals from accelerometers of the user computing device; and automatically initiate a donation from the user computing device to the collection device in response to signals from the accelerometers detecting movement of the user computing device from a first position to a second position.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a charitable donation system that provides for electronic donations and verification that the charitable organization is legitimate. Additionally, the invention relates to a system that provides an easy form of giving to verified charitable organizations without the use of cash. This is particularly relevant as the general population carries less cash and therefore has less cash to provide to charitable organizations at donation locations.

Figure 1A:
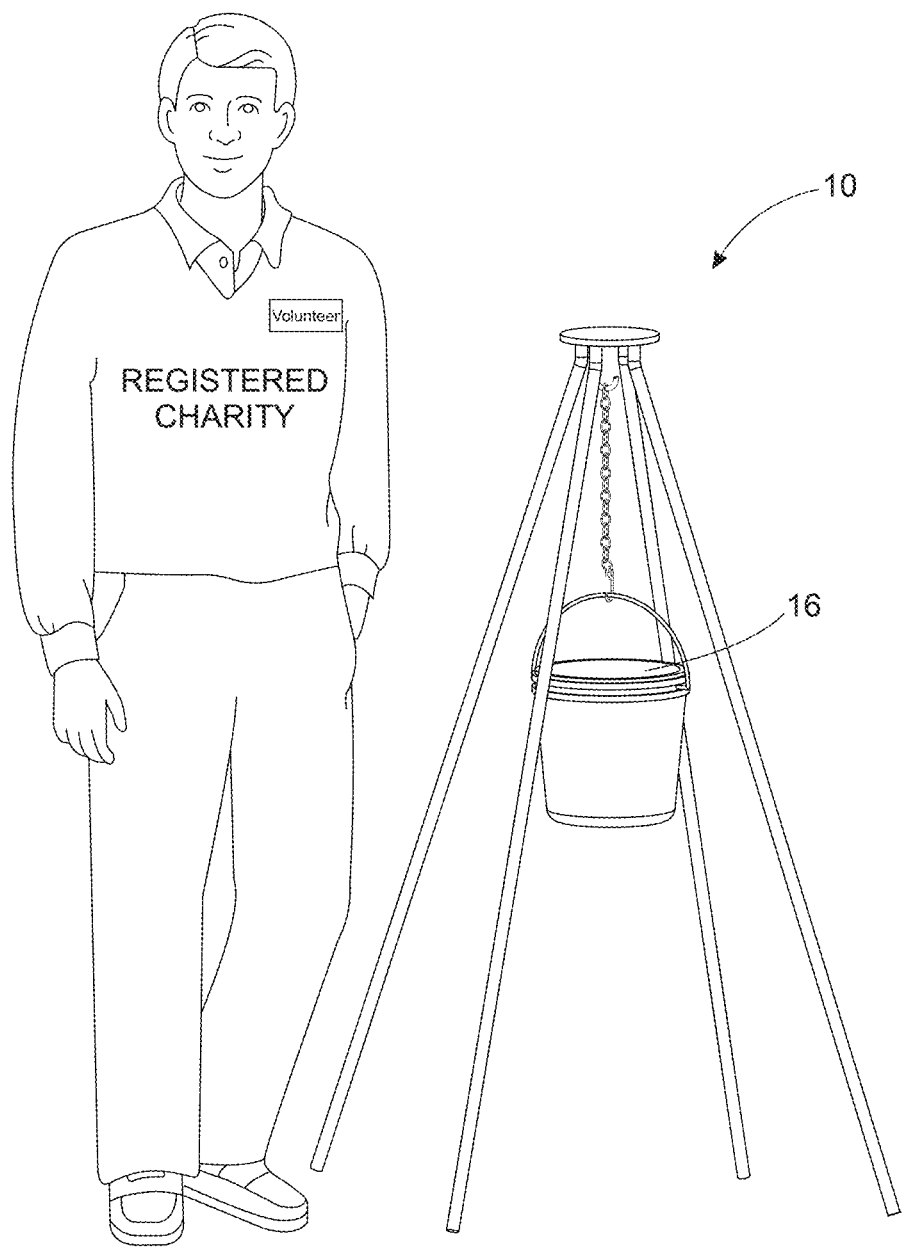
FIG. 1A is perspective view of a donation collection device of a charity donation system in use in accordance with an embodiment.
Figure 1B:
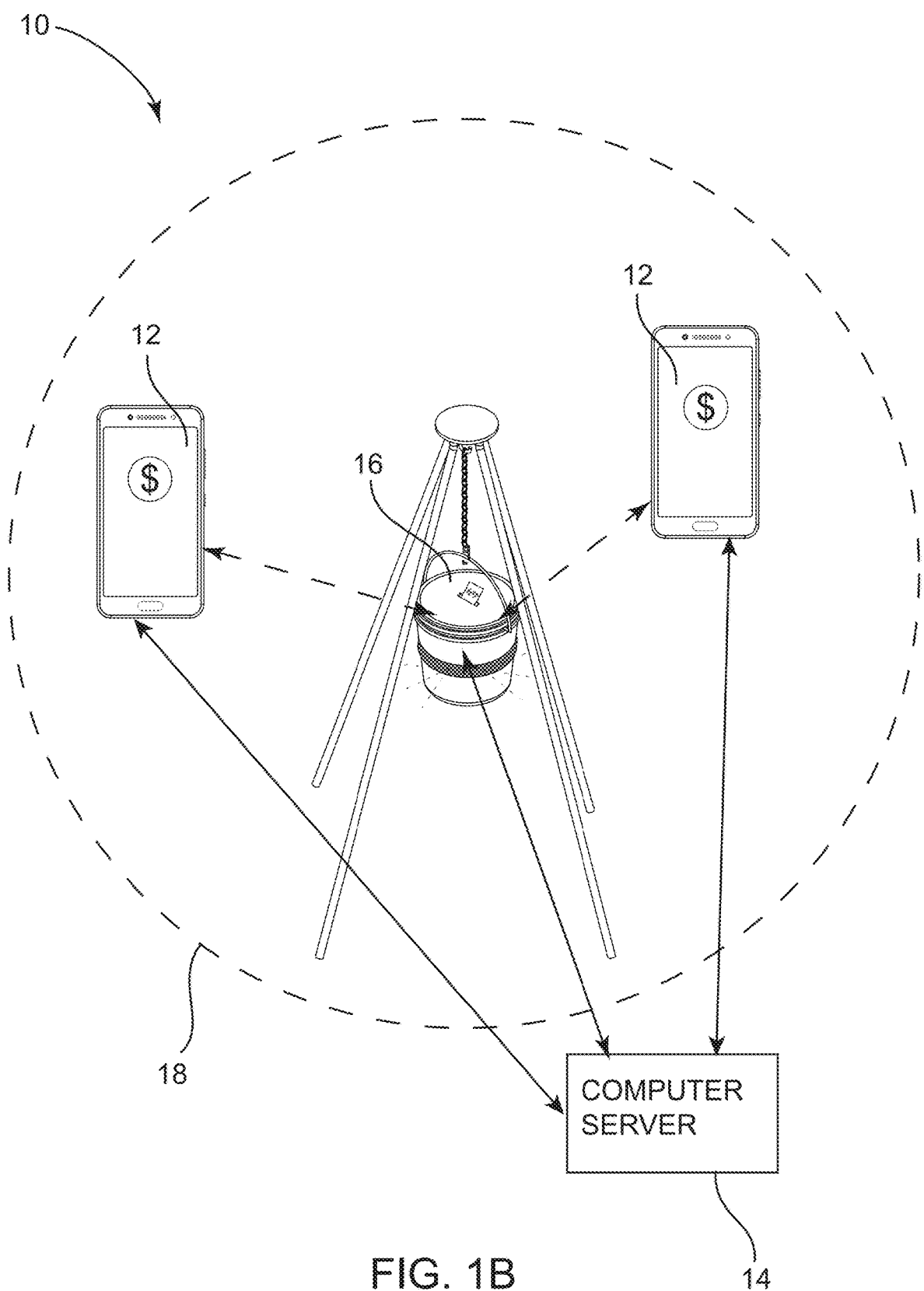
FIG. 1B is a diagrammatic view of a charity donation system in accordance with an embodiment.

Referring to the drawings, FIG. 1 depicts an embodiment of a charitable donation system 10. The system 10 may include user computing devices 12, a computer server 14, and a collection device 16, wherein the user computing devices 12 and the collection device 16 are coupled to the computer server 14. This coupling may be a network connection, such as through an Internet connection, wherein the user computing devices 12 and the collection device 16 may communicate with and receive communication from the server 14.

In embodiments, the collection device may be, without limitation, a smartphone, a tablet, or a bucket with smart electronics coupled thereto for operation within the system, allowing for cash and electronic donations.

Figure 2:
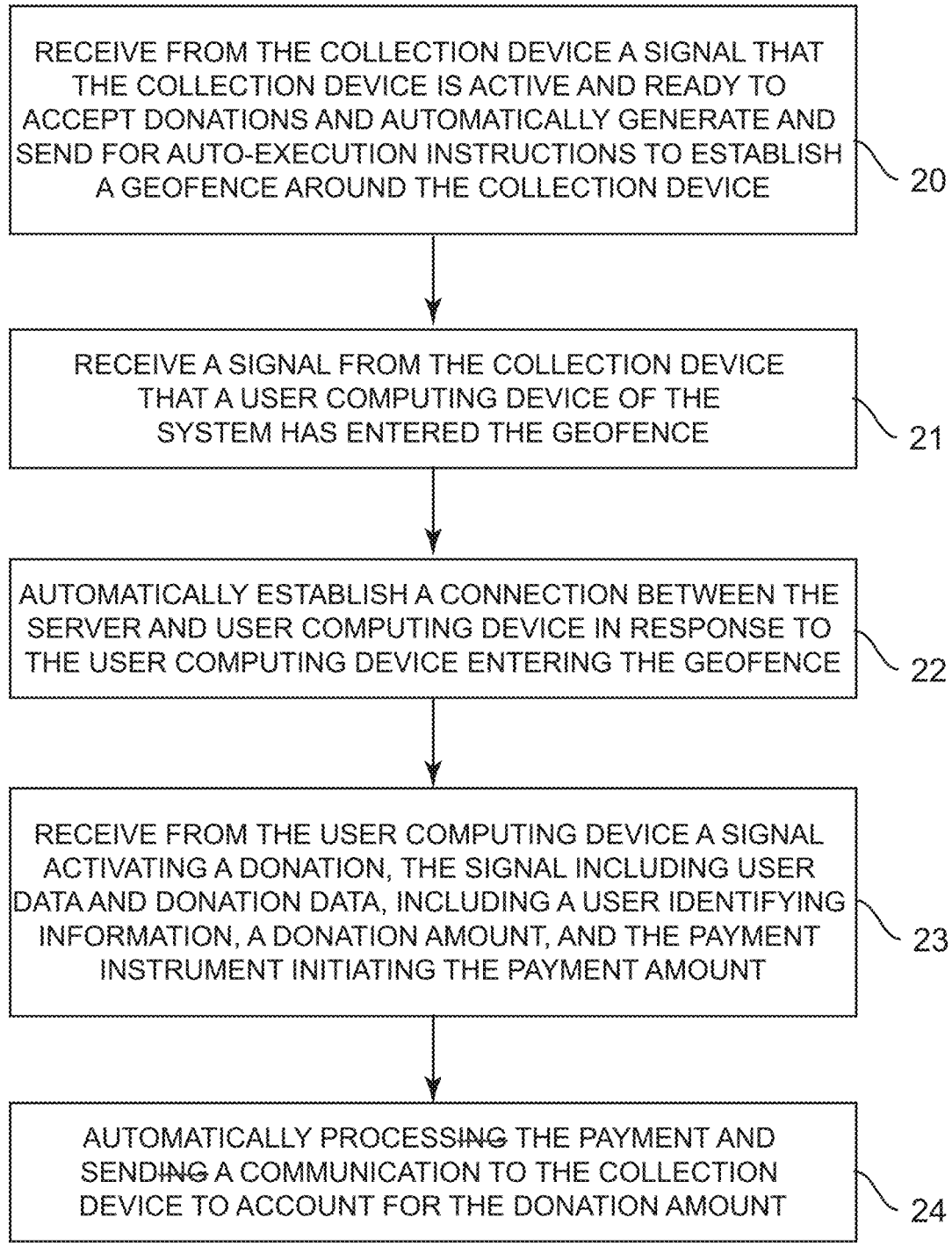
FIG. 2 is a flow chart of programmed steps of a computer server of a charity donation system in accordance with an embodiment.

The computer server 14 may include a memory storing charitable organization data corresponding to various charitable organizations and user data. The charitable organization data includes verification information that the charitable organizations are legitimate, display information, bank account information and the like. The user data may include name, contact information including address, email and phone number and payment account information for effecting a donation, and the like. A user computing device 12 and collection device 16 may be coupled to the computer server 14, and, referring additionally to FIG. 2, the computer server 14 may be programmed to receive from the collection device 16 a signal that the collection device 16 is active and ready to accept donations and automatically generate and send for auto-execution instructions to establish a geofence 18 around the collection device (Step 20); receive a signal from the collection device 16 that a user computing device 12 of the system has entered the geofence 18 (Step 21); automatically establish a connection between the server and the user computing device in response to the user computing device entering the geofence 18 (Step 22); receive from the user computing device a signal activating a donation, the signal including user data and donation data, including a user identifying information, a donation amount, and the payment instrument initiating the payment amount (Step 23); and automatically process the payment and send a communication to the collection device to account for the donation amount (Step 24).

The geofence 18 may be a predetermined size, such as, but not limited to a radius or space, around the collection device. The size of the geofence 18 may be determined by the type of collection device and the charitable organization employing the collection device.

The collection device may include visual and/or audio alerts to signify a donation has been made. This may be a light and/or sound that will alert the user performing the donation that the collection device 16 has received the donation information.

The computer server 14 may further be programmed to verify the charitable organization as legitimate and communicate the verification to the user computing device 12 in response to the user computing device accessing the system within the geofence 18. In some embodiments, the computer server 14 is further programmed to automatically verify the charitable organization as legitimate and communicate the verification to the user computing device 12 in response to the user computing device 12 entering the geofence 18. A charitable organization may register with the system 10, and the system may verify the charitable organization as legitimate and store the verification in memory on the server. Accordingly, the computer server may be programmed to access its memory to determine if the charitable organization associated with the collection device is legitimate.

The computer server may then be programmed to transfer donations to a bank account of the charitable organization. The system may retain a predetermined amount from the total donation amount as a cost for processing the donations and for utilization of the system. This may be automated upon deactivation of the collection device.

Additionally, the computer server 14 may be programmed to automatically account for the donations made utilizing the system 10 by the same user through a user computing device 12. The computer server 14 may be programmed to automatically store in its memory, donation information associated with the user, wherein the donation information may include the charitable organization, the amount of the donation, and the date of the donation. The computer server 14 may be programmed to automatically generate tax documentation of all charitable donations made by the user over a calendar year itemized by charitable organization amount and dates of donations to be used by the user in preparing tax returns.

In other embodiments, the computer server may be further programmed to receive from the user computing device a signal activating a donation, the signal including user data and donation data, including a user identifying information and a pledged donation amount; and automatically process the pledged amount and generate an invoice for the pledged donation amount for sending from the charitable organization to the user.

Figure 3:
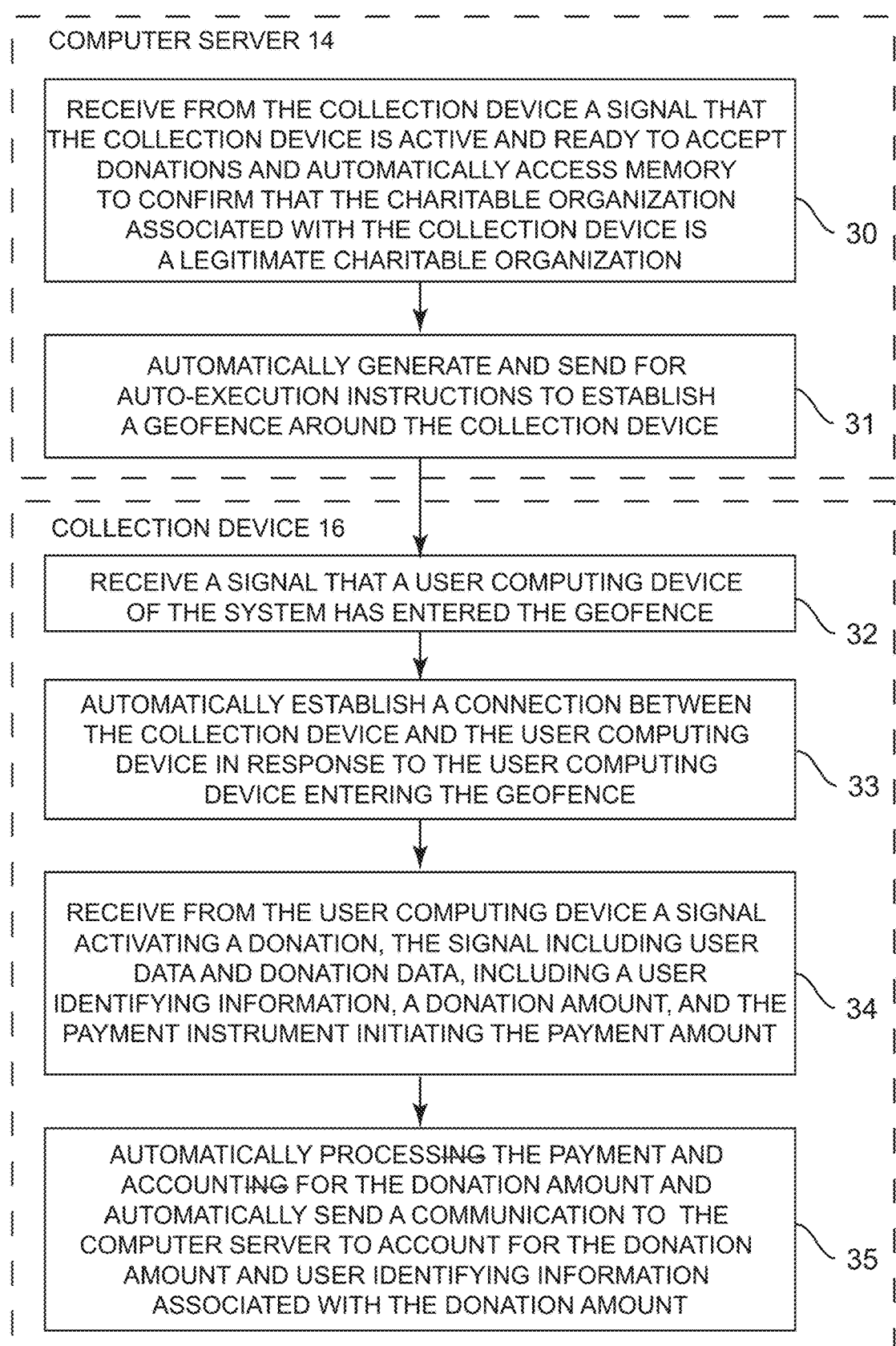
FIG. 3 is a flow chart of operation of a donation between a mobile computing device and donation collection device in accordance with an embodiment.

A user computing device 12 and collection device 16 may be coupled to the computer server 14, and, referring to FIG. 3, the computer server 14 may be programmed to receive from the collection device 16 a signal that the collection device 16 is active and ready to accept donations and automatically access memory to confirm that the charitable organization associated with the collection device 16 is a legitimate charitable organization (Step 30); and automatically generate and send for auto-execution instructions to establish a geofence 18 around the collection device (Step 31). The collection device 16 may be programmed to receive a signal that a user computing device 12 of the system has entered the geofence 18 (Step 32); automatically establish a connection between the collection device and the user computing device in response to the user computing device entering the geofence 18 (Step 33); receive from the user computing device a signal activating a donation, the signal including user data and donation data, including a user identifying information, a donation amount, and the payment instrument initiating the payment amount (Step 34); and automatically process the payment and account for the donation amount and automatically send a communication to the computer server to account for the donation amount and user identifying information associated with the donation amount (Step 35).

The geofence 18 may be a predetermined radius or space around the collection device. The size of the geofence 18 may be determined by the type of collection device and the charitable organization employing the collection device.

The collection device 16 may further be programmed to verify the charitable organization as legitimate and communicate the verification to the user computing device in response to the user computing device accessing the system within the geofence 18. In some embodiments, the collection device 16 is further programmed to automatically verify the charitable organization as legitimate and communicate the verification to the user computing device in response to the user computing device entering the geofence 18. A charitable organization may register with the system, and the system may verify the charitable organization as legitimate and store the verification in memory on the server. Accordingly, the computer server may be programmed to access its memory to determine if the charitable organization associated with the collection device is legitimate.

The computer server may then be programmed to transfer donations to a bank account of the charitable organization. The system may retain a predetermined amount from the total donation amount as a cost for processing the donations and for utilization of the system. This may be automated upon deactivation of the collection device.

Additionally, the computer server 14 may be programmed to automatically account for the donations made utilizing the system 10 by the same user through a user computing device 12. The computer server 14 may be programmed to automatically store in its memory, donation information associated with the user, wherein the donation information may include the charitable organization, the amount of the donation, and the date of the donation. The computer server 14 may be programmed to automatically generate tax documentation of all charitable donations made by the user over a calendar year itemized by charitable organization amount and dates of donations to be used by the user in preparing tax returns.

In other embodiments, the computer server 14 may be further programmed to receive from the user computing device a signal activating a donation, the signal including user data and donation data, including a user identifying information and a pledged donation amount; and automatically process the pledged amount and generate an invoice for the pledged donation amount for sending from the charitable organization to the user.

Figure 4:
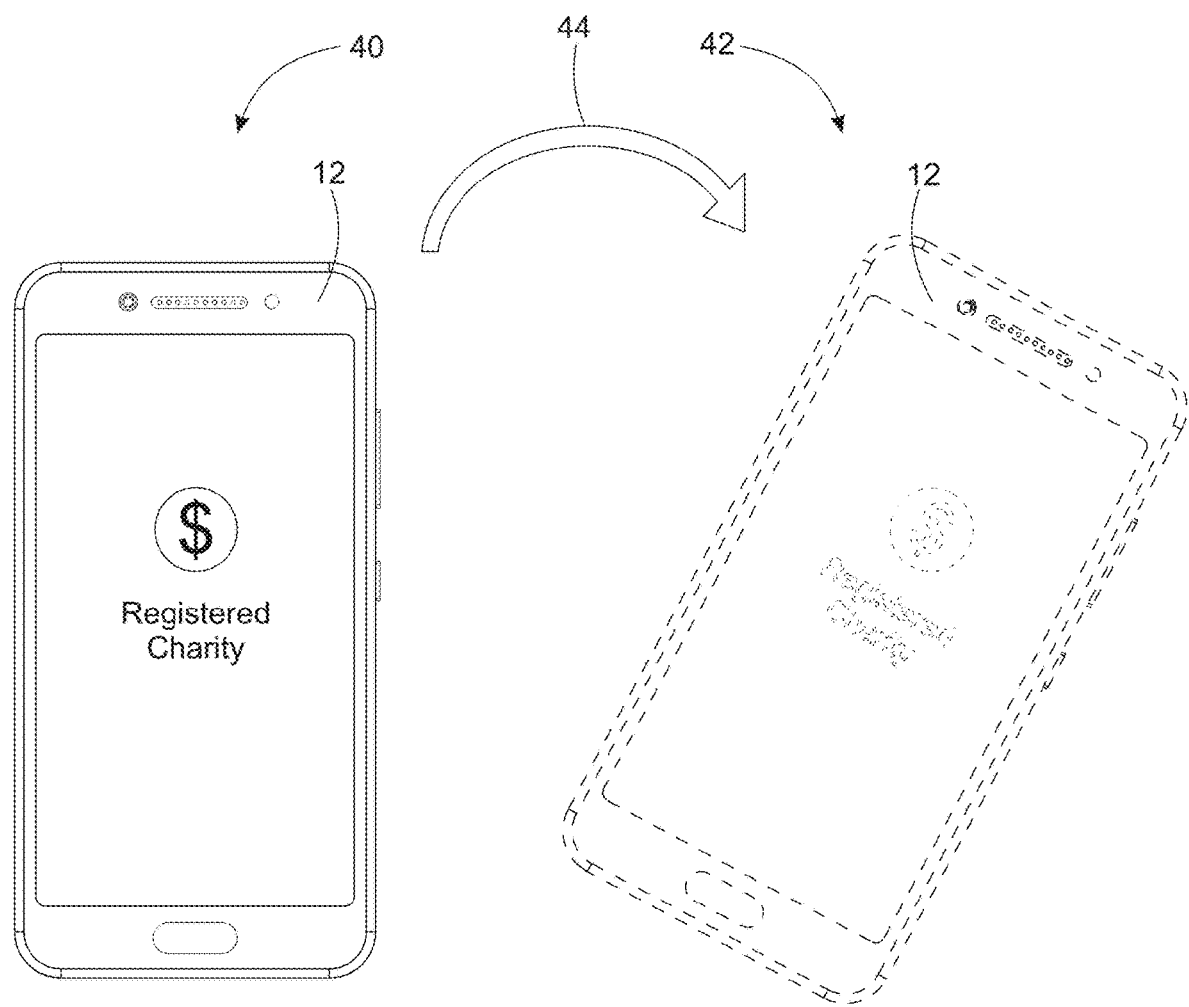
FIG. 4 is a view of a mobile computing device activating sending of a donation to a collection device in accordance with an embodiment.

Referring again to the drawings, FIG. 4 depicts an activation of a donation in accordance with an embodiment. In embodiments, when the user computing device 12 activates a donation, such as within the geofence 18 of the collection device 16, a user may move the user computing device 12 from a first position 40 to a second position 42 with a throwing or tossing motion depicted by arrow 44. This mimics the idea of "throwing" or "tossing" a donation to the charity. The user computing device 12, such as a smartphone or the like, may be programmed to automatically monitor signals from the accelerometers of the user computing device 12 and track when the tossing motion occurs while running the donation application on the user computing device 12, by processing accelerometer signals of motion and/or acceleration of the user computing device 12. The user computing device may then execute instruction programming to transmit an entered donation amount from the user's payment account, such as, but not limited to a bank account, credit card or the like, to the collection device 16. Further, the user computing device 12 may be programmed to initiate a donation or payment of a user defined amount for each toss, wherein the user can perform multiple tosses to increase the amount donated or payed, such as, but not limited to one dollar for each toss and performing five tosses to donate five dollars.

Embodiments may be available on or through the internet, such as through domain names reserved and owned by Applicant that include charitytoss.com, goodtoss.com, dollartoss.com, givingtoss.com, helpingtoss.com, throwdollars.com, giftlegit.com, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A charitable donation system comprising:
   a computer server having a memory storing charitable organization data and user data;
   a collection device coupled to the computer server; and
   a user computing device coupled to the computer server, the computer server programmed to:
      receive from the collection device a signal that the collection device is active and ready to accept donations and automatically generate and send for auto-execution instructions to establish a geofence around the collection device;
      receive a signal from the collection device that a user computing device of the system has entered the geofence;
      automatically establish a connection between the server and the user computing device in response to the user computing device entering the geofence;
      receive from the user computing device a signal activating a donation in response to movement of the user computing device from a first position to a second position, the signal including user data and donation data, including a user identifying information, a donation amount, and the payment instrument initiating the payment amount; and
      automatically process the payment and send a communication to the collection device to account for the donation amount.

2. The system of claim 1, wherein the user computing device is programmed to automatically monitor signals from accelerometers of the user computing device.

3. The system of claim 2, wherein the user computing device is further programmed to automatically initiate the donation from the user computing device to the collection device in response to signals from the accelerometers detecting movement of the user computing device from the first position to the second position.

4. The system of claim 1, wherein movement from the first position to the second position is a tossing motion.

5. The system of claim 1, wherein the geofence has a predetermined size around the collection device.

6. The system of claim 5, wherein the predetermined size of the geofence is determined by the type of collection device and the charitable organization employing the collection device.

7. The system of claim 1, wherein the computer server is further programmed to verify the charitable organization as legitimate and communicate the verification to the user computing device in response to the user computing device accessing the system within the geofence.

8. The system of claim 1, wherein the computer server is further programmed to automatically verify the charitable organization as legitimate and communicate the verification to the user computing device in response to the user computing device entering the geofence.

9. The system of claim 1, wherein the computer server is further programmed to transfer donations to a bank account of the charitable organization.

10. The system of claim 1, wherein the computer server is further programmed to automatically account for the donations made utilizing the system by the user.

11. The system of claim 10, wherein the computer server is further programmed to automatically store in its memory, donation information associated with the user, wherein the donation information includes the charitable organization, the amount of the donation, and the date of the donation.

12. The system of claim 11, wherein the computer server is further programmed to automatically generate tax documentation of all charitable donations made by the user over a calendar year itemized by charitable organization amount and dates of donations to be used by the user in preparing tax returns and transmit the generated tax documentation to the user computing device.

* * * * *